United States Patent [19]

Raasch et al.

[11] Patent Number: 5,499,773
[45] Date of Patent: Mar. 19, 1996

[54] YARN GUIDE ROD FOR A MACHINE PRODUCING CROSS-WOUND BOBBINS

[75] Inventors: Hans Raasch, Mönchengladbach; Willi Wassen, Schwalmtal, both of Germany

[73] Assignee: W. Schlafhorst AG & Co., Monchen-Gladbach, Germany

[21] Appl. No.: 153,226

[22] Filed: Nov. 15, 1993

[30] Foreign Application Priority Data

Nov. 14, 1992 [DE] Germany ............... 42 38 475.3

[51] Int. Cl.$^6$ ................ B65H 54/00; B65H 57/00
[52] U.S. Cl. ................ 242/43 R; 57/1 R; 242/1; 242/157 R; 242/157.10; 403/236; 403/404
[58] Field of Search ............... 57/1 R, 99; 242/1, 242/43 R, 157.1, 157 R, 38.5 R, 118.3, 118.31, 118.32; 403/236, 404

[56] References Cited

U.S. PATENT DOCUMENTS

| | | | |
|---|---|---|---|
| 2,365,115 | 12/1944 | Siegenthaler | 242/43 |
| 2,738,137 | 3/1956 | Breen. | |
| 2,895,756 | 7/1959 | Gair | 287/62 |
| 3,706,720 | 12/1972 | Lapidas et al. | 242/157 |
| 3,858,818 | 1/1975 | Melz | 242/43 |
| 4,033,520 | 7/1977 | Mims et al. | 242/43 R |
| 4,113,194 | 9/1978 | Hensley | 242/43 R |
| 4,652,171 | 3/1987 | Schuetze | 405/403 |

FOREIGN PATENT DOCUMENTS

| | | |
|---|---|---|
| 2906728 | 8/1979 | Germany. |
| 3345743 | 6/1985 | Germany. |
| 3408650 | 9/1985 | Germany. |
| 3434027 | 3/1986 | Germany. |
| 8710308 | 10/1987 | Germany. |
| 3812493 | 10/1989 | Germany. |
| 1312246 | 4/1973 | United Kingdom. |

Primary Examiner—William Stryjewski
Attorney, Agent, or Firm—Herbert L. Lerner; Laurence A. Greenberg

[57] ABSTRACT

A machine producing cross-wound bobbins or cheeses has a yarn guide rod including axially coupled-together partial rods. Each partial rod includes a tubular abrasion-proof jacket, and a compact bar body being formed essentially of fibers embedded in a plastic matrix and being disposed in and joined to the tubular jacket in a shift-proof manner.

10 Claims, 2 Drawing Sheets

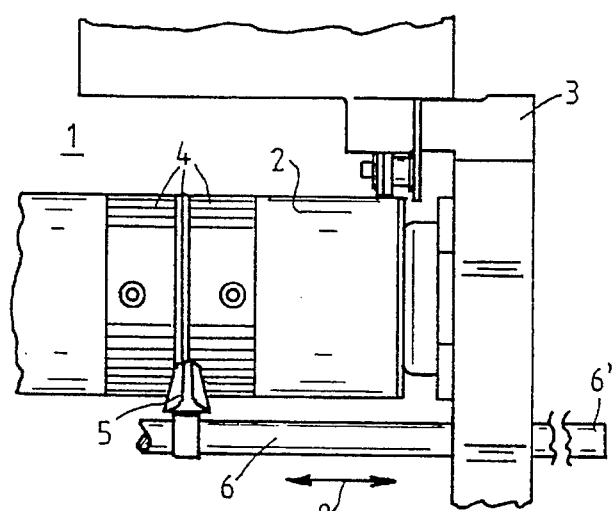
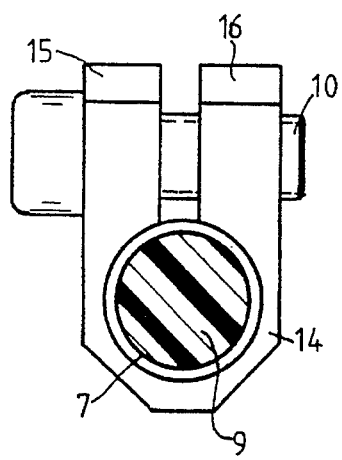
FIG. 1    FIG. 2
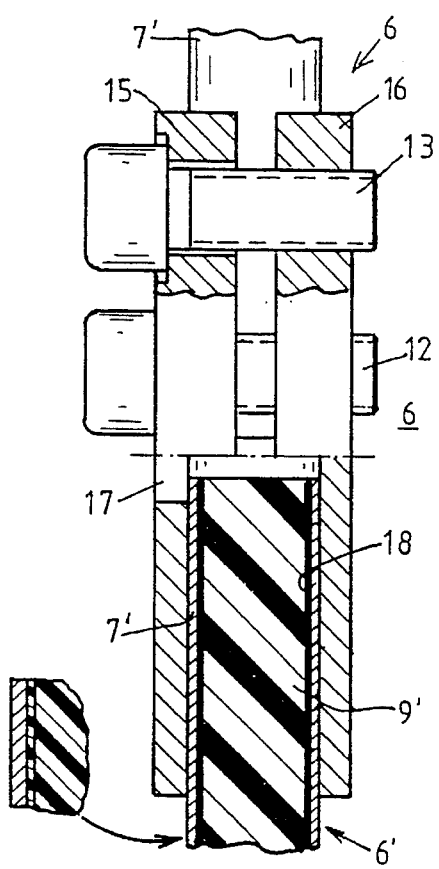
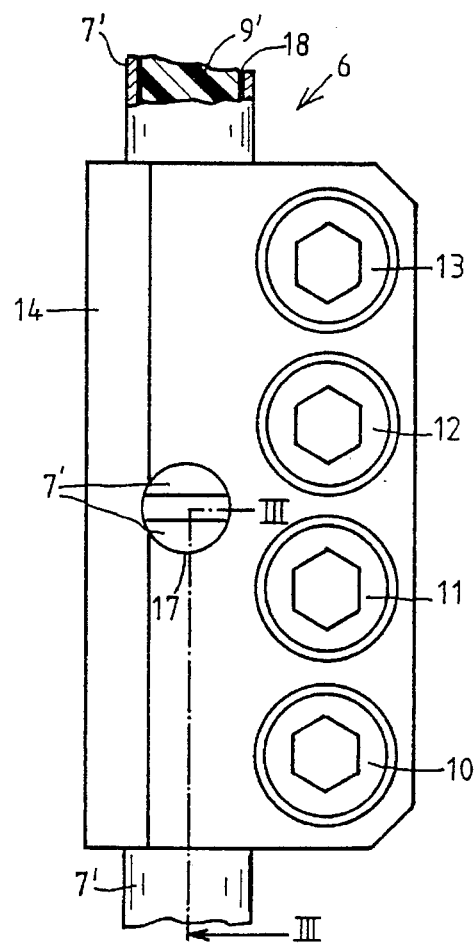
FIG. 3    FIG. 4

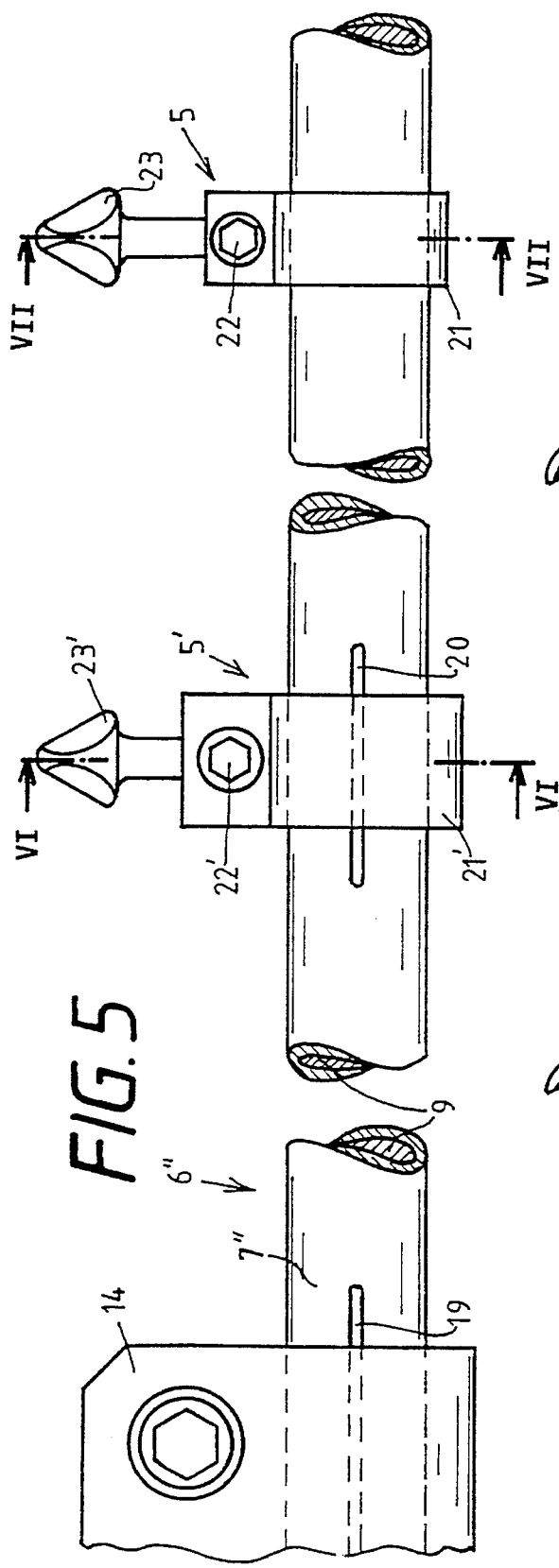
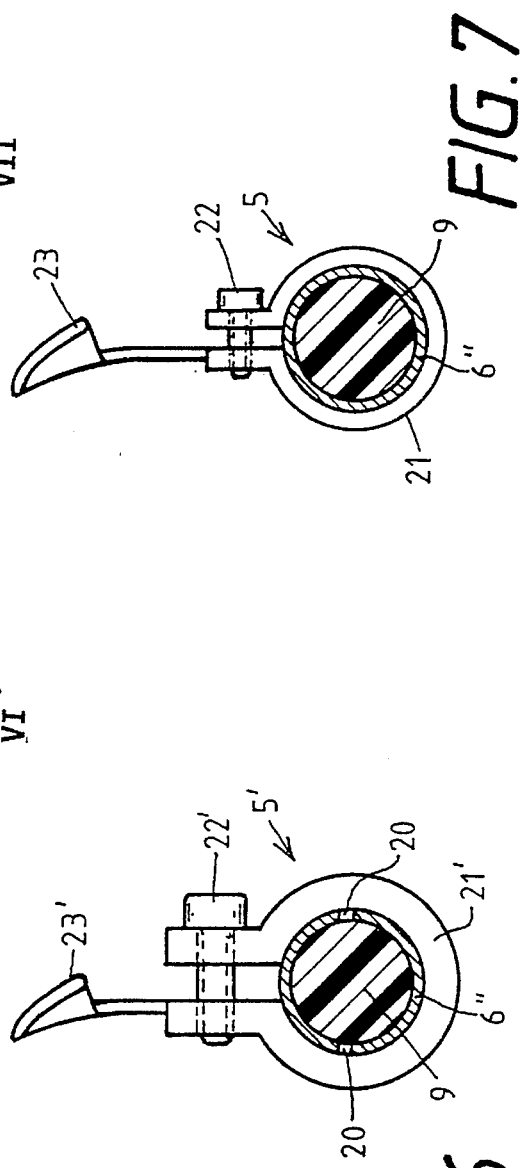

YARN GUIDE ROD FOR A MACHINE PRODUCING CROSS-WOUND BOBBINS

BACKGROUND OF THE INVENTION

1. Field of the Invention

The invention relates to a yarn guide rod for a machine that produces cross-wound bobbins or cheeses, which includes axially coupled-together partial rods being formed essentially of fibers embedded in a plastic matrix.

Machines that produce cross-wound bobbins or cheeses, such as open-end spinning machines, are relatively long (20 to 30 meters, for instance) and have many production stations for cheeses located next to one another. In such machines, yarn guide rods are used to control the reciprocating yarn guides of one entire side of the machine. That kind of yarn guide rod must accordingly have a corresponding length. Like the machine units disposed next to one another and mounted to one another at a setup site, it is therefore fabricated in individual rod segments, which are coupled together upon installation. The rod connection of the partial rods must be firm and immune to vibration, they must remain dimensionally stable over a high number of hours in operation, yet they must be separable.

One such rod connection, that is referred to therein as a gripping fist, has been disclosed by German Published, Non-Prosecuted Application DE 38 12 493 A1. The partial rods to be joined therein are formed of steel tubes having ends with inlays for reinforcement in the region of the connecting elements.

The tubular yarn guide rods that are coupled together from partial rods, with their considerable length as mentioned above, are strained, for instance with a stroke of 150 to 300 mm and a yarn guide frequency of 1 to 8 Hz. If the natural frequency is inadequately far from the yarn guide frequency, then the resonant behavior of such a yarn guide bar is unfavorable. In other words, resonance step-ups and therefore malfunctions can occur. Above all, an additional longitudinal vibration is superimposed on the actual stroke of the yarn guide rod from stretching or elongation at the stroke turning point. This additional vibration may have an amplitude of several millimeters at the end of the yarn guide rod opposite the drive mechanism. The result is wider bobbins with poorer yarn winding on that end of the machine.

In order to counteract that problem, it has already been proposed in German Published, Non-Prosecuted Application DE 34 34 027 A1 that the yarn guide rod be fabricated from multiply-vaned profile rods with a star-shaped or radial profile, which are made of artificial-resin-reinforced fibers, that is fibers embedded in a plastic matrix. The profile described therein is supposed to be constructed in such a way that ceramic parts, for instance, can be clipped in place and at the same time adhesively bonded between the profile vanes that extend longitudinally of the yarn guide rod. Those ceramic parts should in turn form the slide partner for slide bearings with which the yarn guide rod is guided. Moreover, such connecting parts are intended to serve as mounts for the actual yarn guides. Other parts that are secured in the same way are intended to perform the function of rod connectors. Finally, the profile structure is intended to make it possible to catch abrasion from the profile material, in order to prevent abraded material from being entrained by the traveling yarn and wound up.

The above-described construction is relatively complicated. Moreover, the clipping and adhesive bonding connections cannot withstand the heavy strains during operation, over the long term.

SUMMARY OF THE INVENTION

It is accordingly an object of the invention to provide a yarn guide rod for a machine producing cross-bobbins, which overcomes the hereinafore-mentioned disadvantages of the heretofore-known devices of this general type, which has a simple construction and which withstands long-term strain over a high number of hours in operation.

With the foregoing and other objects in view there is provided, in accordance with the invention, in a machine producing cross-wound bobbins or cheeses, a yarn guide rod, comprising axially coupled-together partial rods each including a tubular abrasion or wear-proof jacket, and a compact bar body being formed essentially of fibers embedded in a plastic matrix and being disposed in and joined to the tubular jacket in a shift-proof manner.

Aside from the simple fabrication of a compact bar body, the composite with the tubular abrasion-proof jacket according to the invention assures that the bar body of artificial-resin-reinforced fibers is completely shielded. It is therefore unnecessary to take precautions to protect the traveling yarn from any possible abrasion that might occur. Moreover, alteration of the yarn guide rod from abrasion is effectively counteracted. The abrasion-proof jacket is suited not only to serve as a slide partner in the slide bearing of the mount of the yarn guide rod but also to permit the yarn guide to be secured directly to the jacket. Coupling of the partial rods can be performed with the aid of the gripping fist described initially above, and inlays in the fastening region can be dispensed with because of the incorporated compact bar body.

In accordance with another feature of the invention, the fibers embedded in the plastic matrix are carbon fibers. Although glass fibers may, for instance, also be used as the fiber material, carbon fibers have an advantage because of their higher modulus of elasticity.

In accordance with a further feature of the invention, the tubular jacket is thin-walled and is formed of metal and preferably steel. As compared with other abrasion-proof materials, metal and in particular steel is preferred for the tubular jacket. The thin-walled jacket is used to keep the weight of the yarn guide rod as low as possible. As compared with a known yarn guide rod that is merely formed of a tube, for instance, it is possible to reduce the wall thickness to one-half (from 1 mm to 0.5 mm, for instance), since the jacket of the present invention then merely needs to perform the functions of a slide partner and a carrier for the yarn guides, to shield the bar body, and to receive the gripping fist serving to receive the connection. The longitudinal forces arising during operation are predominantly absorbed by the compact bar body, in the composite according to the invention.

In accordance with an added feature of the invention, the composite formed of partial rods can be produced by means of an adhesive bond or a press fit. In either case, a connection that is shift-proof enough to prevent the longitudinal forces that arise during operation from affecting the composite, is attained.

In accordance with an additional feature of the invention, while the two types of composite mentioned above are durable, it is also possible to construct the composite by means of a separable connection. In accordance with yet another feature of the invention, clamping elements may be used for this purpose, with the aid of which the partial rods are coupled to make the entire yarn guide rod. In accordance with yet a further feature of the invention, the clamping points of yarn guides are constructed in such a way that a separable connection is also created at those points.

In accordance with a concomitant feature of the invention, the partial rods have longitudinal slits formed therein in the vicinity of the separable connections.

Other features which are considered as characteristic for the invention are set forth in the appended claims.

Although the invention is illustrated and described herein as embodied in a yarn guide rod for a machine producing cross-bobbins, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, elevational view of one example of an installation of a yarn guide rod at a winding station of an automatic spinning/winding machine;

FIG. 2 is an enlarged sectional view of a connecting point of two partial rods;

FIG. 3 is a fragmentary, partly sectional, side-elevational view of a connecting point of two partial rods;

FIG. 4 is a fragmentary plan view of a connecting point of two partial rods;

FIG. 5 is a fragmentary, side-elevational view of a variant of a yarn guide rod of the invention;

FIG. 6 is a sectional view taken along a line VI—VI of FIG. 5, in the direction of the arrows; and FIG. 7 is a sectional view taken along a line VII—VII of FIG. 5, in the direction of the arrows.

DESCRIPTION OF THE PREFERRED EMBODIMENTS

Referring now to the figures of the drawing in detail and first, particularly, to FIG. 1 thereof, there is seen a friction drum 2 which is rotatably supported in a machine frame 3 at a winding station 1 of an automatic spinning/winding machine, which is not shown in further detail herein. This drum 2 drives a non-illustrated cross-wound bobbin or cheese, particularly through the use of a friction covering or coating 4 thereof. A yarn that is also not illustrated in this case, is delivered to the cross-wound bobbin or cheese from below through a yarn guide 5. The yarn guide 5 is secured to a yarn guide rod 6. The yarn guide rod 6 is likewise supported in the machine frame 3. This may involve a slide bearing, for instance. It would be equally conceivable to support the yarn guide rod in a known manner in opposed rollers that are grooved to match the curvature of the yarn guide rod. A double arrow 8 indicates that the yarn guide rod 6 is moved oscillatingly back and forth during the winding operation.

The yarn guide rod 6 includes partial rods 6', having a length which is equivalent to the length of typical assembly units.

FIGS. 2–4 show a separable connection of the partial rods 6' to make the yarn guide rod 6, which is similar to a connection that is known per se from German Published, Non-Prosecuted Application DE 38 12 493 A1. This type of connection can advantageously also be used for the yarn guide rod according to the invention. Thus the advantages of this connection, which reside in its high reliability under extreme operating conditions, its simplicity, and its ease of separability, can be exploited in full.

However, unlike the rod connection described in German Published, Non-Prosecuted Application DE 38 12 493 A1, a bar body 9 of carbon fiber reinforced plastic simultaneously takes over the function in the region of a connection of a pressure-proof inlay that stabilizes the connection. A tube 7 or 7' that forms an abrasion-proof jacket has a wall thickness which is is reduced to one-half the wall thickness of the tube used in the prior art. Therefore, the weight of this component of the composite body is likewise halved.

In FIG. 2, as a variant of the composite body, the tube 7 is joined by a press-fit to the bar body 9 of carbon fiber reinforced plastic. This press fit can be produced, for instance, if the respective inside and outside diameters of the tube 7 and the bar body 9 initially differ from one another by approximately 0.2 mm. It is then possible to insert the bar body 9 into the tube 7. Subsequently, the ends of the tube are sealed. The tube is pressed at high pressure onto the bar body in a fluid, causing both the inside and the outside diameter of the tube to decrease by approximately 0.2 mm.

This method, which exploits the uniform propagation of pressure in a fluid, makes it possible to effectively avoid deformation of the circular cross section of the tube or slippage in the longitudinal direction.

However, producing the composite by shrink-fitting on the tube is also conceivable.

The change in outside diameter may optionally be taken into account either by making the tube with a suitably larger outside diameter, or else the low tolerance in diameter may be compensated for in the machine, such as when the machine is retrofitted with this yarn guide rod according to the invention.

Another variant for producing the composite according to the invention includes the creation of an adhesive connection by means of an artificial resin 18. After the insertion of a bar body 9' into the tube that is indicated by reference numeral 7', which is also performed in this case, the artificial resin 18 is introduced into a gap therebetween, for instance by means of a vacuum. This variant for producing the composite is suggested in FIGS. 3 and 4.

In the case of the clamping connection as shown in FIGS. 2–4, the transfer of force takes place with the aid of a metal gripping fist or socket 14 that overlaps adjacent ends of the partial rods 6' in aligned fashion and is provided with separable clamping screws 10–13. This gripping fist 14 has two vane-like ends 15 and 16. The end 16 has threaded holes for receiving the clamping screws 10–13, which are disposed in a row. The other end 15 has only through bores for receiving the clamping screws, as is shown particularly in FIG. 3. Two clamping screws are provided for holding each one of the two ends of the rod. The ends of the partial rods 6' are located at a distance of approximately 2.5 mm from one another in the gripping fist 14, as FIGS. 3 and 4 show. At that point, the gripping fist 14 has an inspection or assembly opening 17.

The connection is shown on a larger scale in FIGS. 2–4. The partial rods 6' have an outside diameter of 10 mm. The wall thickness of the tubes 7 and 7' is 0.5 mm in each case.

The tubes 7, 7' are of high-strength steel and are chromium-plated on the outer surface thereof.

It can be seen that with the least possible expenditure of material while having a simple construction, the clamping or gripping fist 14 fits around the ends of the partial rods 6' and is constructed to be more bulky only where the clamping screws 10–13 are seated. Upon assembly, the gripping fist 14 can be turned around or disposed on the bar ends in such a way that the row of screws is located at a place where it is not in the way, while in contrast the other parts of the gripping fist 14 can escape parts of the machine that extend near the yarn guide rod 6.

A variant of the invention is shown in FIGS. 5–7. In this variant, the shift-proof connection between a tube 7" and the bar body 9 is formed by separable connections. These separable connections firstly include the gripping fists 14 that serve to couple partial rods 6", and secondly include suitably reinforced yarn guides 5'.

The tube 7" is provided with slits 19 and 20 each extending longitudinally of the tube, in the region of the connecting points. These slits are provided in order to reduce the already very slight resistance of the tube 7" at this point to deformation which is associated with the clamping.

Although one slit would be suitable for this purpose at each clamping point, it is advantageous to provide at least two slits that are distributed over the tube circumference with equal spacing. These slits 19 and 20 have a very slight width, and as a result the function of shielding the bar body 9 is not impaired.

While the yarn guide 5 only has a cuff-like clamping body 21 that is dimensioned so as to assure an adequate hold of a yarn guide 5 on the yarn guide rod, a clamping body 21' of the yarn guide 5' is markedly more sturdy. Similarly, fastening screws 22 and 22' are adapted to the dimensioning of the two clamping bodies 21 and 21'. Yarn guide tabs 23 and 23' that serve to actually guide the yarn have no differences in terms of their shaping.

The yarn guides 5' are advantageously distributed uniformly over the length of the partial rod 6". It may be sufficient to merely place three such yarn guides 5' over the length of the partial rod to reinforce the composite. However, it should be noted in this respect that depending on the length of the entire yarn guide rod, it may already prove adequate for the separable composite to be attained solely by means of the gripping fists 14 at the coupling points of the partial rods 6" and for merely unreinforced yarn guides 5 to be disposed between the gripping fists 14. If the machine lengths are greater, it may then become necessary, in order to maintain a secure composite, to provide a suitable number of reinforced yarn guides 5', in order to thereby increase the number of connecting points.

The total weight of the yarn guide rod according to the invention is approximately equivalent to the weight of the known tubular yarn guide rod, even through the void present in the known construction is filled by the bar body 9, 9' in the invention. The tube wall is reduced to half. Moreover, the carbon fiber reinforced plastic has only approximately one-fifth the volume weight as compared with steel.

With basically the same weight, the composite according to the invention also has the same inertia, but as compared with the known steel tube it has a markedly improved load-bearing capacity in the direction of strain. This is because even though the modulus of elasticity of the carbon fiber-reinforced plastic is only approximately half as high as that of steel, the effective cross-sectional area of the composite rod according to the invention is increased quite considerably in proportion to the known steel tube. Yet this effective cross-sectional area is definitive for the possible load-bearing capacity of the composite rod.

Concretely, this means that in normal operation the additional vibration superimposed on the normal vibration drops to approximately half, because of the greater load-bearing capacity in the longitudinal direction of the yarn guide rod. At the same time, the natural frequency of the system increases by a factor of 1.4, and consequently has a markedly greater separation from the exciter frequency, which is the operating frequency of the yarn guide rod. In this way, a marked decrease in the deviation of the bobbin width on the end of the yarn guide rod opposite the yarn guide transmission is attained, along with an improvement in bobbin quality. Since moreover the dimensions of the yarn guide rod of the invention are no different or only slightly different from those of conventional yarn guide rods, these rods can be replaced without difficulty and without requiring an additional replacement of other parts.

We claim:

1. In a machine producing cross-wound bobbins or cheeses, a yarn guide rod for supporting multiple yarn guides, comprising:
    axially coupled-together partial rods together defining the yarn-guide rod, each of said partial rods including:
    a tubular abrasion-proof jacket, and
    a compact bar body disposed in and extending throughout said tubular jacket, said compact bar body being formed essentially of fibers embedded in a plastic matrix and being joined to said tubular jacket in a shift-proof manner.

2. The yarn guide rod according to claim 1, wherein the fibers embedded in the plastic matrix are carbon fibers.

3. The yarn guide rod according to claim 1, wherein said tubular jacket is thin-walled and is formed of metal.

4. The yarn guide rod according to claim 3, wherein said tubular jacket is formed of steel.

5. The yarn guide rod according to claim 1, wherein a shift-proof composite of said partial rods includes an adhesive connection.

6. The yarn guide rod according to claim 1, wherein a shift-proof composite of said partial rods is formed by a press-fit.

7. The yarn guide rod according to claim 1, wherein said partial rods have end regions, and a shift-proof composite of said partial rods is formed by separable connections at least in said end regions.

8. The yarn guide rod according to claim 7, wherein said separable connections include clamping connections for coupling said rods and clamping connections for securing yarn guides.

9. The yarn guide rod according to claim 7, wherein said partial rods have longitudinal slits formed therein in the vicinity of said separable connections.

10. In combination with a machine producing cross-wound bobbins or cheeses of the type having a multiplicity of stations disposed next to one another at which cheeses are produced by feeding yarn through respective reciprocating yarn guides and winding the yarn onto the respective cheeses, a yarn guide rod for rigidly coupling a multiplicity of the yarn guides to one another, the yarn guide comprising:
    a plurality of axially coupled partial rods together defining the yarn-guide rod, each of said partial rods including:
    a tubular abrasion-proof jacket defining an interior, and
    a compact bar body disposed in said interior and substantially extending through the entire interior, said compact bar body being formed essentially of fibers embedded in a plastic matrix and being joined to said tubular jacket in a shift-proof manner.

* * * * *